United States Patent
Lubeley et al.

(10) Patent No.: US 10,706,196 B2
(45) Date of Patent: Jul. 7, 2020

(54) INCREMENTAL GENERATION OF AN FPGA IMPLEMENTATION WITH A GRAPH-BASED SIMILARITY SEARCH

(71) Applicant: dSPACE digital signal processing and control engineering GmbH, Paderborn (DE)

(72) Inventors: Dominik Lubeley, Verl (DE); Heiko Kalte, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 16/207,457

(22) Filed: Dec. 3, 2018

(65) Prior Publication Data

US 2019/0213294 A1  Jul. 11, 2019

(30) Foreign Application Priority Data

Jan. 10, 2018 (DE) .................. 10 2018 100 423

(51) Int. Cl.
*G06F 17/50* (2006.01)
*G06F 30/34* (2020.01)
(Continued)

(52) U.S. Cl.
CPC .......... *G06F 30/34* (2020.01); *G06F 16/9024* (2019.01); *G06F 16/90335* (2019.01);
(Continued)

(58) Field of Classification Search
CPC ...... G06F 30/34; G06F 30/327; G06F 30/343; G06F 30/347; G06F 16/90335; G06F 16/9024; G06F 2117/06
(Continued)

(56) References Cited

U.S. PATENT DOCUMENTS 6,453,454 B1   9/2002 Lee et al.
7,017,043 B1 * 3/2006 Potkonjak ............ G06T 1/0021
                                                  713/176
(Continued)

OTHER PUBLICATIONS

Altera; "3. Quartus II Incremental Compilation for Hierarchical and Team-Based Design", Quartus II Handbook Version 13.1, vol. 1, Design and Synthesis; Nov. 2013.
(Continued)

*Primary Examiner* — Phallaka Kik
(74) *Attorney, Agent, or Firm* — Muncy, Geissler, Olds & Lowe, P.C.

(57) ABSTRACT

A method for generating an FPGA implementation based on an FPGA design serving as an FPGA model and/or a hardware description, including the steps of synthesizing a net list from the FPGA design and generating the FPGA implementation from the net list. The method includes searching for a similar FPGA implementation, the step of generating the FPGA implementation from the net list takes place using the similar FPGA implementation, the method includes a step of generating a graph-based representation based on the FPGA design, and the step of searching for a similar FPGA implementation comprises comparing the graph-based representation of the FPGA design with a graph-based representation of the at least one similar FPGA implementation. A method for generating a bit stream based on an FPGA design is also provided, serving as an FPGA model and/or a hardware description.

16 Claims, 9 Drawing Sheets

(51) Int. Cl.
*G06F 30/39* (2020.01)
*G06F 30/327* (2020.01)
*G06F 16/903* (2019.01)
*G06F 16/901* (2019.01)
*G06F 117/06* (2020.01)

(52) U.S. Cl.
CPC ............ *G06F 30/327* (2020.01); *G06F 30/39* (2020.01); *G06F 2117/06* (2020.01)

(58) Field of Classification Search
USPC .................... 716/103, 116, 121, 128; 703/15
See application file for complete search history.

(56) References Cited

U.S. PATENT DOCUMENTS

| | | | | |
|---|---|---|---|---|
| 7,055,120 | B2 * | 5/2006 | Teig | G06F 17/5072 716/113 |
| 7,237,214 | B1 * | 6/2007 | Pandey | G06F 17/5072 716/131 |
| 7,284,228 | B1 * | 10/2007 | Haratsaris | G06F 17/5009 716/117 |
| 7,804,504 | B1 * | 9/2010 | Agarwal | G06F 15/7867 345/505 |
| 8,196,081 | B1 | 6/2012 | Arslan et al. | |
| 8,533,643 | B2 * | 9/2013 | Guo | G06F 17/504 716/101 |
| 8,578,311 | B1 * | 11/2013 | Baumgartner | G06F 17/5081 716/107 |
| 8,788,991 | B2 * | 7/2014 | Xu | G06F 17/505 716/104 |
| 9,444,702 | B1 * | 9/2016 | Raponi | H04L 43/045 |
| 9,875,333 | B1 * | 1/2018 | Verma | G06F 17/5031 |
| 2008/0162777 | A1 * | 7/2008 | Kaiser | G06F 16/9024 711/100 |
| 2009/0030665 | A1 * | 1/2009 | Kerns | G06F 17/5036 703/14 |
| 2010/0017774 | A1 * | 1/2010 | Bachina | G06F 17/5054 716/128 |
| 2013/0198709 | A1 * | 8/2013 | Balance | G06F 17/5081 716/111 |
| 2015/0220530 | A1 * | 8/2015 | Banadaki | G06F 16/90 707/723 |
| 2015/0324509 | A1 | 11/2015 | Xue et al. | |

OTHER PUBLICATIONS

German Search Report dated Apr. 22, 2020 in corresponding application 102018100423.0.

* cited by examiner

INCREMENTAL GENERATION OF AN FPGA IMPLEMENTATION WITH A GRAPH-BASED SIMILARITY SEARCH

This nonprovisional application claims priority under 35 U.S.C. § 119(a) to German Patent Application No. 10 2018 100 423.0, which was filed in Germany on Jan. 10, 2018, and which is herein incorporated by reference.

BACKGROUND OF THE INVENTION

Field of the Invention

The present invention relates to a method for generating an FPGA implementation based on an FPGA design serving as an FPGA model and/or a hardware description, comprising the steps of synthesizing a net list from the FPGA design, and generating the FPGA implementation based on the net list, wherein the method comprises searching for a similar FPGA implementation, and the step of generating the FPGA implementation from the net list is done using the similar FPGA implementation.

Description of the Background Art

Furthermore, the invention relates to a method for generating a bit stream based on an FPGA design serving as an FPGA model and/or a hardware specification, including the above steps for generating an FPGA implementation based on an FPGA design serving as an FPGA model and/or a hardware description, and the generation of the bit stream based on the FPGA implementation.

Such methods are used to generate code for FPGAs (Field Programmable Gate Array). FPGAs are integrated circuits to which a logic circuit can be loaded. In contrast to classical programming in a known programming language, rather than including preset timed sequences, it includes the definition of the desired circuit pattern.

An FPGA design for defining the desired circuit pattern is typically generated as a graphical FPGA model, which is translated into a hardware description language such as VHDL. In principle, the FPGA design can also be generated directly in the hardware description language.

In a synthesis step, the FPGA design is first translated by a corresponding software into a net list that specifies how individual logic elements are to be interconnected in the FPGA. One therefore speaks of the configuration of an FPGA. The net list with the logic elements and their interconnection is stored for future use.

This is followed by a step to create the FPGA implementation. This step is commonly referred to as "place and route". In this context, the logic elements stored in the net list are placed for the FPGA (place) and connected according to the net list (route). The result is the FPGA implementation.

Following, a bit stream is generated based on the FPGA implementation, which is transferred to the FPGA in order to implement a desired function therein.

The above steps are often summarized as a "build".

Nowadays, there are easy-to-use tools that provide, for example, an abstracting FPGA development environment for clients so that clients can develop their own hardware without detailed knowledge of FPGAs and tool flows. Clients can thus create and implement FPGA designs and operate these in a corresponding FPGA hardware, the FPGA. Regular modifications to the FPGA model with a subsequent re-build are a natural part of such a development process, e.g., in rapid control prototyping.

Often, one problem in this regard is very long build times, which may also be needed to rebuild an FPGA with even a minor modification in the FPGA model. The build times often range a number of hours. Since the FPGAs are becoming more and more complex and provide more resources in the form of registers, logic, DSP blocks or memory, build times continue to increase. This can only be partially compensated by algorithm improvements and faster machines to perform the build. A particularly time-consuming step is usually the placing and routing.

In the current FPGA tools, there are two approaches to reduce the build times. Both approaches are based on the fact that unmodified regions/components of an already successfully-generated FPGA implementation are reused. In the first approach, each component is assigned a (rectangular) region in the FPGA. When a component is modified, the region with this component is newly implemented, while the remainder of the FPGA implementation remains unmodified and can be reused. The second approach, referred to here as an incremental build, does not require any predefined regions. For implementation, an already implemented FPGA implementation is given as a reference. If there is a match to a high degree, many placements and routings can be automatically adopted and the time for generating the FPGA implementation is reduced.

It may be advantageous if an FPGA implementation is generated from the start in a way that individual modules or partial implementations can be reused. This approach pursues an automatic modularization of the FPGA model. On the basis of this module, floorplanning can take place, i.e., a division into regions. If there are reserves for each module, modifications in the FPGA model can be limited to the individual modules.

In addition, methods for replanning are known. If a client has made modifications to their FPGA model, the latest build result is used. Based on that, modified modules are built individually and then replaced in the overall build. In the event that multiple modules are affected, build times can be reduced if the build for the modified modules takes place on different computers. Thus, a parallel build of the modified modules is carried out. In this case, a versioning of different module versions may be provided in order to facilitate reuse.

Although these methods can reduce build times, there is still room for improvement. For example, in a fine granular modularization, there is great waste and an increased risk of timing violations since it is not possible to optimize over module boundaries and each module must be provided with a generous range, including sufficient reserves. In addition, the method can only be applied with great implementation effort during product development.

To find a similarity between two designs, current synthesis tools compare a reference net list with the net list to be newly placed and routed. The comparison is based exclusively on a name comparison of net list path names. This is problematic because it is common for abstracting, high-level FPGA design tools such as Xilinx Vivado System Generator, Xilinx Vivado HLS, Xilinx Vivado SDSoC, to perform a quick renaming and reorganization of identical FPGA components, e.g., subsystems. This automatically results in new net list paths even for virtually identical components. The renaming cannot be recognized by the current synthesis tools.

SUMMARY OF THE INVENTION

It is therefore an object of the present invention to provide a method for generating an FPGA implementation based on an FPGA design serving as an FPGA model and/or a hardware description, and a method for generating a bit stream that is based on an FPGA design serving as an FPGA model and/or a hardware description of the type mentioned above, which allow for simple and efficient generation of an FPGA implementation, in particular using existing, similar FPGA implementations.

According to an exemplary embodiment of the invention, a method is provided for generating an FPGA implementation that is based on an FPGA design serving as an FPGA model and/or a hardware specification, including the steps of synthesizing a net list that is based on the FPGA design, and generating the FPGA implementation from the net list, wherein said method comprises searching for a similar FPGA implementation, the step of generating the FPGA implementation from the netlist is done by using the similar FPGA implementation, the method includes a step of generating a graph-based representation based on the FPGA design, and the step of searching for a similar FPGA implementation comprises a comparison of the graph-based representation of the FPGA design with a graph-based representation of the at least one similar FPGA implementation.

According to the invention, a method is also provided for generating a bit stream based on an FPGA design serving as an FPGA model and/or a hardware specification, including the above steps for generating an FPGA implementation based on an FPGA design serving as an FPGA model and/or a hardware description, and the generation of the bit stream from the generated FPGA implementation.

The basic idea of the present invention is therefore to find similarities of a current FPGA model with other, for example, previous FPGA models and to perform an efficient generation of the FPGA implementation. Based thereon, an incremental generation of the current FPGA implementation is performed, based on at least one existing, similar FPGA implementation. The similar FPGA implementation or at least similar sub-regions thereof are then used to generate the current FPGA implementation. Since placing and routing the FPGA logic for generating the FPGA implementation typically takes up most of the FPGA build time, this generally reduces the time it takes to generate the FPGA build.

The FPGA design is typically produced as a graphic FPGA model, which is translated into a hardware description language. In principle, the FPGA design can also be generated directly in the hardware description language. As a hardware description language, for example, VHDL is known. VHDL is known as Very High Speed Integrated Circuit Hardware Description Language (also known as VHSIC Hardware Description Language)

In a synthesis step, the FPGA design is then first translated into a net list by an appropriate software, which dictates how individual logic elements should be interconnected in the FPGA. One therefore speaks of the configuration of an FPGA. The net list with the logic elements and their interconnection is saved for future use.

This is followed by a step to create the FPGA implementation. This step is commonly referred to as "place and route". The logic elements stored in the net list are placed (place) for the FPGA and connected (route) according to the net list. The result is the FPGA implementation.

Subsequently, a bit stream is generated from the FPGA implementation which is transferred to the FPGA to implement a desired function therein.

The above steps are often summarized as a "build".

A synthesized net list can be archived in a database as an artifact of the respective FPGA model so that in a subsequent build, the appropriate FPGA implementation can be used as a reference for searching for a similar FPGA implementation, if necessary. A search for a similar, possible FPGA implementation as a reference can already be performed during synthesis. For this purpose, the graph-based representation is first created based on the FPGA design and is compared with graphs of previously implemented FPGA designs.

The creation of the graph of the at least one similar FPGA implementation typically occurs during a corresponding build of the similar FPGA implementation. This means that the similar FPGA implementations are generated conventionally or according to the method identified herein, starting from a respective FPGA design. The graphs of these FPGA implementations are then also generated based on the particular FPGA design.

Overall, the method can be easily implemented, wherein different steps can be performed in parallel. This allows for resources to be used efficiently. A most similar FPGA implementation may be chosen, or a minimal similarity is assumed in order to use a similar FPGA implementation as the basis for the FPGA design. If sufficient similarity is given, a corresponding FPGA implementation can be used as a reference. If further FPGA designs are available that have not yet been tested for similarity, the search for similar or most similar FPGA implementations can continue with these FPGA designs.

When creating the graph from the FPGA design, blocks of the FPGA model are transformed to nodes and signal lines are transformed to edges. The method is hierarchically applicable. Graphic subsystems can either be interpreted as a block for a first rapid estimation or they can be completely de-hierarchized to an arbitrary depth. For example, a transformation function may allow de-hierarchizing of FPGA models down to their basic blocks, taking into account virtual connections (Goto/From, DataStoreRead/DataStoreMemory/DataStoreWrite, Triggerports, Actionports, . . . ), and the generation of a directed graph from them. In this case, the FPGA model may be formed not only of a continuous graph, but comprise a plurality of separate graphs. Such separate graphs result, for example, when sub-functions independent from each other are implemented in an FPGA design.

Comparing the graph-based representation of the FPGA design with a graph-based representation of the at least one similar FPGA implementation is done based on an algorithm for the similarity analysis of graphs. Based on a measure of similarity between every two nodes of two graphs, known algorithms can be applied. A measure of the similarity between two nodes is determined by the degree of correspondence of a block/net list path (also partial), a block/net list type (e.g., add, multiply), and block/net list parameters/attributes (e.g., bit width, binary point position).

The FPGA design comprises a partial implementation; the search for a similar FPGA implementation comprises searching for a similar partial implementation, and the step of generating the FPGA implementation is done using the similar partial implementation. The similarity search task can thus be broken down into several sub-tasks by identifying and comparing the similarity for these partial implementations.

The search for a similar FPGA implementation comprises searching for a similar FPGA implementation in a database of prior FPGA implementations. For example, all FPGA implementations can be stored in the database to make them available for later use. The database preferably includes FPGA implementations that were generated in the context of a project, since that way an increased probability of a similar FPGA implementation can be expected. The search for a similar FPGA implementation can thus be limited in scope.

The method comprises a step of identifying a modified sub-region of the FPGA design, the synthesis of a net list comprises the synthesis of the net list from the modified sub-region of the FPGA design, and the generation of an FPGA implementation includes generating the FPGA implementation for the net list of the modified sub-region of the FPGA design. Creating a new FPGA implementation can thus be limited from the outset to modified sub-regions of the FPGA design. Preferably, blocks of the FPGA design are considered for which the FPGA implementation can be individually re-implemented.

The method comprises a step of determining a measure of similarity between the graph-based representation of the FPGA design and the graph-based representation of the at least one similar FPGA implementation, and the method comprises a conventional step of generating the FPGA implementation from the net list without using a similar FPGA implementation if the measure of similarity is below a threshold value. That is, if a suitable similar FPGA implementation is found as a reference, it can be used during the creation of the current FPGA implementation. Otherwise, the FPGA model must be completely re-implemented. The sooner it is recognized that there is no meaningful FPGA implementation that can be used as a reference, of which the degree of similarity is above the threshold value, the fewer resources are required to search for the similar FPGA implementation. This allows for the build time to be reduced as compared to an incremental build with widely differing FPGA models, i.e., when the degree of similarity is below the threshold value. The threshold value is preferably a similarity of 75%. More preferably, the threshold is a similarity of 85%, even more preferably 90%.

The step of comparing the graph-based representation of the FPGA design with the graph-based representation of the at least one similar FPGA implementation comprises solving a linear optimization problem in which for each node in a graph, the most similar node in another graph is identified without a node being assigned twice. A procedure according to Kuhn known as the "Hungarian method" is used. The Hungarian method is used to solve the linear optimization problem of finding a most similar node in another graph for every graph node without a node being assigned twice. The method maximizes the overall similarity. Neighborhood relations can, however, be included as a measure of the similarity between two blocks. The procedure is generally carried out without considering neighborhood relations.

The method comprises a step of determining a similarity between a node of the graph-based representation of the FPGA design and a node of the graph-based representation of the at least one similar FPGA implementation by determining a match of differentiation points. The differentiation points include, for example, a block/net list path (also partial), a block/net list type, e.g., add/multiply, a block/net list parameter, e.g., bit width, binary point position.

The step of determining a match of differentiation points comprises a weighting of the differentiation points. Due to the weighting, the differentiation points can be taken into account to varying degrees.

The method comprises an additional step of carrying out a similarity analysis of a plurality of graphs contained in the database and a storing of the computed similarities in a similarity diagram or a similarity matrix. Such similarities found in the similarity analysis can thus be stored to facilitate a future search of a similar FPGA implementation by comparing the graph-based representation of the FPGA design with a graph-based representation of the at least one similar FPGA implementation. The computed similarities are similarities that are found in the search for the similar FPGA implementation.

The method comprises an additional step of calculating similarities of relationships between the graphs contained in the database. Thus, for example, a kind of "hashing" can be performed by pre-analyzing the graphs or subgraphs, and acquiring and storing a structure thereof. For example, the structure may be stored as a so-called hash value. Thus, in a subsequent comparison of similarities of graphs, this comparison may be performed based on the computed similarities of relationships, whereby the search for a similar FPGA implementation by comparing the graph-based representation of the FPGA design with a graph-based representation of the at least one similar FPGA implementation is facilitated by the structure. The step of calculating similarities of relationships between the graphs contained in the database is associated with a great computational effort and should be done in phases in which free resources can be used, for example, during the modeling phase of the developer in which the FPGA design is generated at a low processing load. It is preferable to create a similarity graph from multiple FPGA models that stores results of similarity analyses of all FPGA models that have been compared to each other. Similarities between two FPGA models that have been examined are specified as an edge between the corresponding two nodes, for example, with a weighting as the measure of similarity. In a fully meshed similarity graph, the similarity between each FPGA model and every other FPGA model is specified. A complete similarity graph makes it possible to find an ideal starting point for an incremental FPGA build. Completion can be achieved in several ways. As a first variant, missing edges for fully meshing the similarity graphs can be supplemented by further similarity analyses according to a brute-force method. This leads, as stated above, to a great need for computing power and can therefore take place, for example, during the creation of the FPGA design with a low CPU load, for example, in the background. The second variant is based on an efficient computation sequence of existing FPGA implementations. In this case, a similarity between two nodes is estimated on the basis of existing edges, where potentially high similarities can be found, in order to perform a similarity analysis for them as a matter of priority. This way, the meshing of the similarity graph can be further completed. For example, a probability estimate may be used. In doing so, similarities are multiplied analogously along a path via existing edges: path 2-1-4=45%×85%=38%. According to a third variant, the similarity between two nodes is estimated based on existing edges with the estimates of Variation 2. An exact similarity of the FPGA designs is not analyzed in this estimate.

The method comprises an additional step of prior determination of expected high similarities of as yet undetermined relationships based on already determined similarities. The sooner it is discovered which similar FPGA implementation can be used as a reference, or whether a similar FPGA implementation can be used as a reference, the more efficiently the method can be performed.

The step of comparing the graph-based representation of the FPGA design with a graph-based representation of the at least one similar FPGA implementation comprises neighbor matching to take neighborhood relationships into account. Such a method is known, for example as "Measuring Similarity of Graph Nodes by Neighbor Matching" by Nikolic. Here, a similarity is determined as a similarity between two graphs, and results from the summation of node similarities of optimal node correspondences of the optimization divided by a number of nodes.

The step of generating a graph-based representation based on the FPGA design comprises de-hierarchizing the FPGA design while taking into account virtual connections and applying a transformation function based on the de-hierarchization of the FPGA design. In hierarchical subsystems, these can either be interpreted as a block for a first rapid estimation, or be completely de-hierarchized at an arbitrary depth. The transformation is required to capture virtual connections and dependencies of the hierarchical blocks and to apply them correctly when using such blocks as a basis for creating the FPGA implementation. The virtual connections may include, for example, connections such as Goto/From, DataStoreRead/DataStoreMemory/DataStoreWrite, Triggerports, Actionports, or the like.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

FIGS. 1 to 4 illustrate a method for generating an FPGA implementation and a bit stream from the FPGA implementation, based on an FPGA design as an FPGA model and/or a hardware description.

Figure 1:
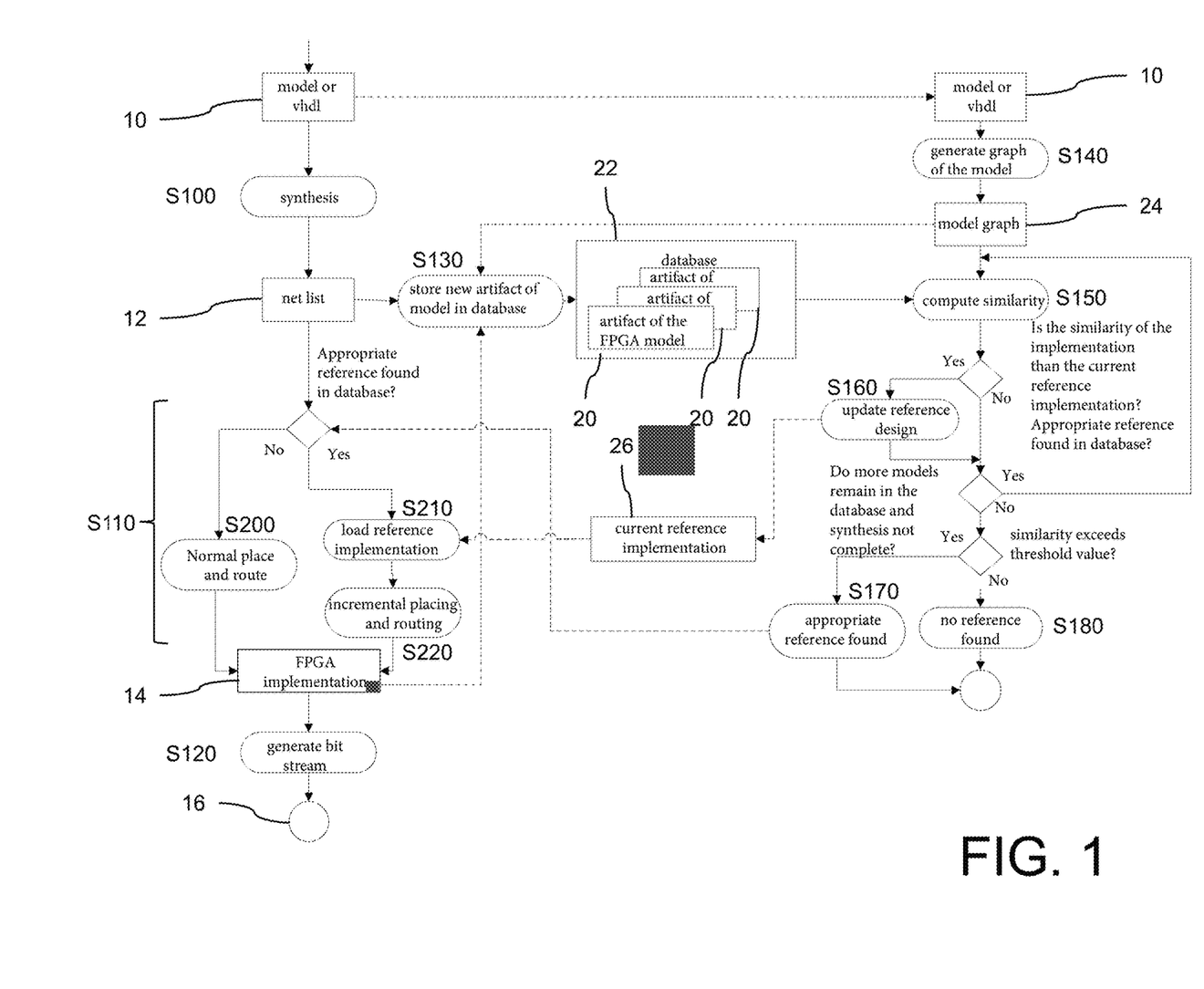
FIG. 1 is a flow diagram for implementing a method for generating an FPGA implementation and a bit stream from the FPGA implementation, based on an FPGA design according to an exemplary embodiment.

As the starting point of the method, an FPGA design 10 is generated and provided as a graphic FPGA model. The FPGA model is then translated to a hardware description language, in this case, for example, VHDL (VHDL).

Based on this, a build can be started which first comprises the steps S100, S110 and S120 described in detail below.

In step S100, a net list 12 is synthesized from the FPGA design 10. The net list 12 includes logic elements and their interconnections as indicated in the FPGA design 10.

In step S110, an FPGA implementation 14 is generated from the net list 12. This step is commonly referred to as "place and route". The logic elements stored in the netlist 12 are placed for the FPGA (place) and connected to each other according to the net list 12 (route). The result is the FPGA implementation 14. Details of step S110 will be explained below.

In step S120, a bit stream 16 is created from the generated FPGA implementation 14 for transfer to an FPGA and for use with the FPGA.

Figure 4:
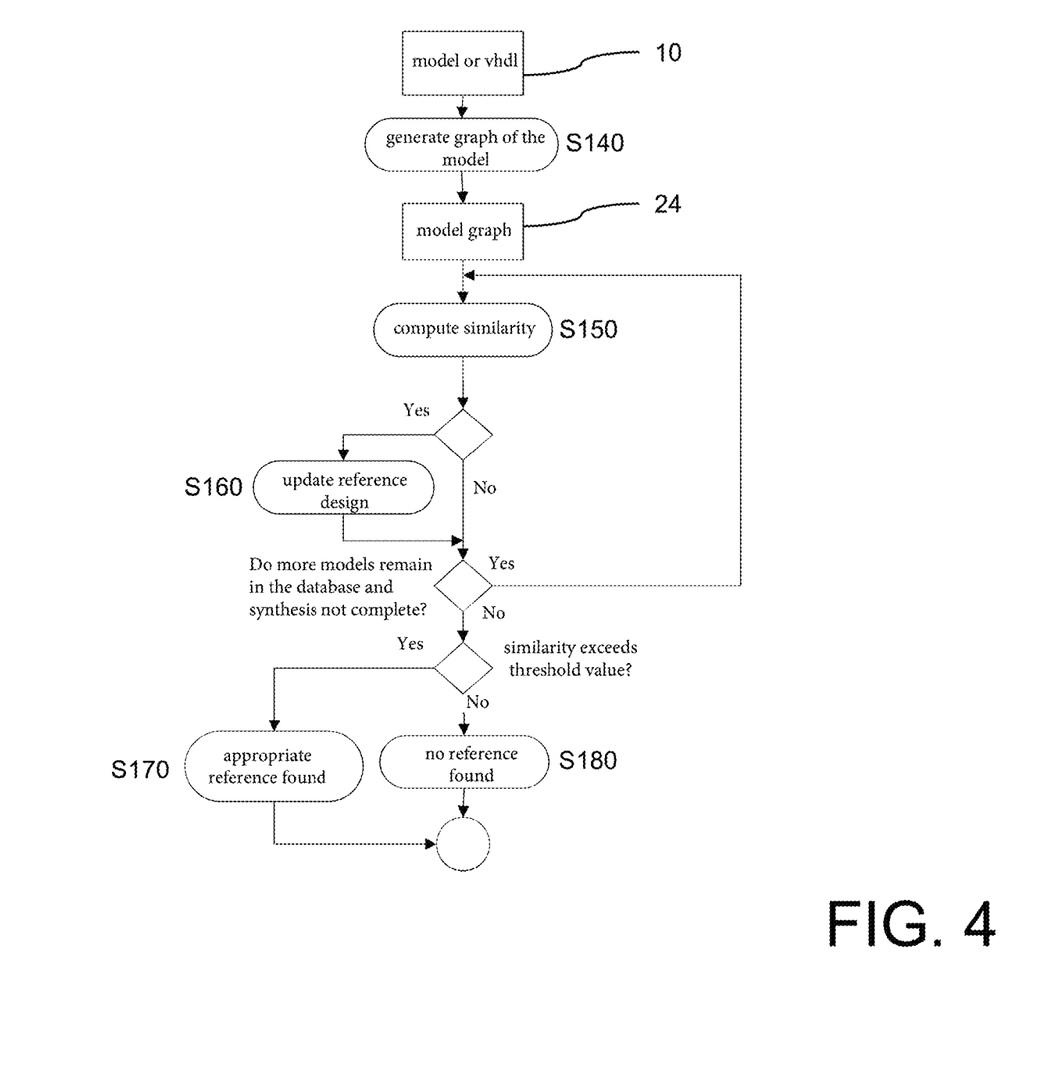
FIG. 4 is a detailed view of the flow diagram of FIG. 1 for identifying a similar FPGA design in accordance with the first embodiment.

As shown in detail in FIG. 4, steps S140 to S180 for determining a similar FPGA design are performed in parallel to the previous steps, in particular in parallel to step S100.

Figure 8:
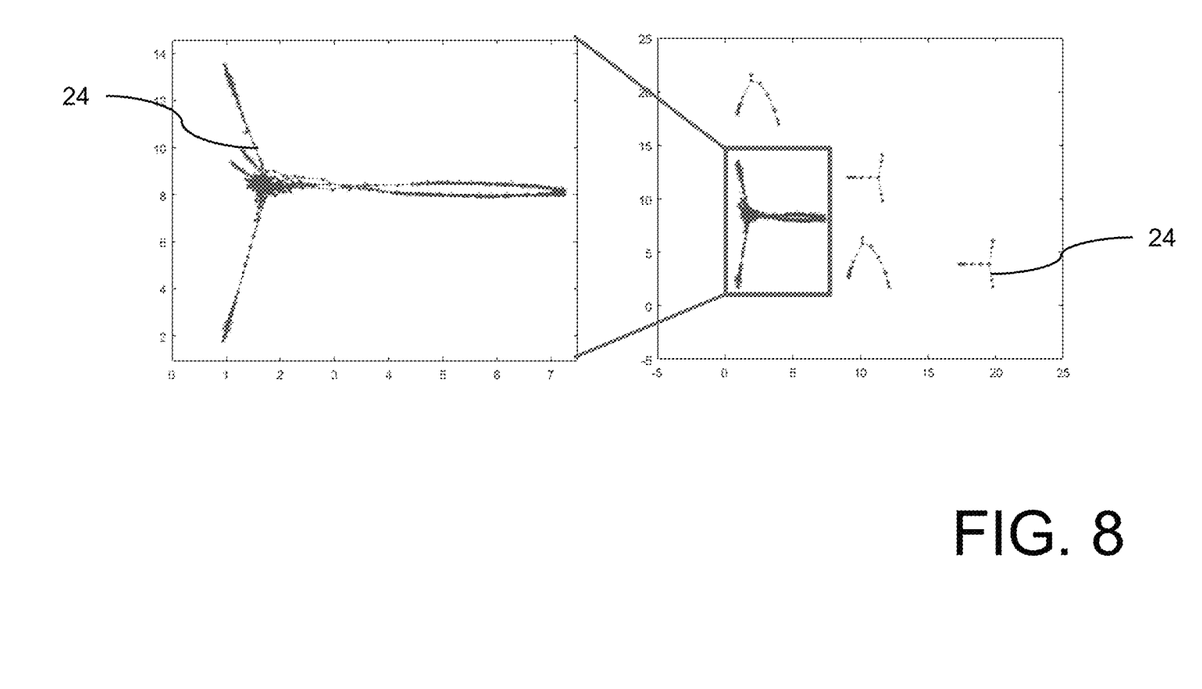
FIG. 8 is a schematic representation of an exemplary model graph.

Thus, a model graph 24 is produced in step S140 as a graph-based representation based on the FPGA design 10. When building the model graph 24 from the FPGA design 10, blocks of the FPGA model 10 become nodes and signal lines are transformed into edges. A model graph 24 is shown as an example in FIG. 8, wherein a plurality of independent model graphs 24 are implemented and displayed together. In this case, graphic subsystems can be interpreted as a block for a first rapid estimation, or they can be completely de-hierarchized at an arbitrary depth. A transformation function may, for example, enable the de-hierarchization of FPGA models down to their basic blocks whilst taking into account virtual connections (Goto/From, DataStoreRead/DataStoreMemory/DataStoreWrite, Triggerports, Actionports, etc.), and generate a directed graph from them. As part of the de-hierarchization of the FPGA design 10, virtual connections are considered and a transformation function based on the de-hierarchization of the FPGA design 10 is applied.

In a step S150, the similarity of the model graph 24 is compared with a model graph 24 from a database 22. The model graph 24 from the database 22 is a graph-based representation of a previous FPGA implementation 14.

First, a comparison of the model graph 24 of the current FPGA design 10 with the model graph 24 of the previous FPGA implementation 14 from the database 22 is performed based on an algorithm for the similarity analysis of graphs. On the basis of a measure of the similarity between every two nodes 34 of two model graphs 24, a measure of the similarity of the nodes 34 is determined by means of the degree of matching by a block/net list path (also partial), a block/net list type (e.g., add, multiply), and block/net list parameter/attributes (e.g., bit width, binary point position).

The comparison further comprises solving a linear optimization problem in which to each node 34 in a model graph 24, the most similar node 34 in another model graph 24 is identified without duplicate assignment of a node 34. This is generally known as the "Hungarian method" according to Kuhn.

Figure 9:
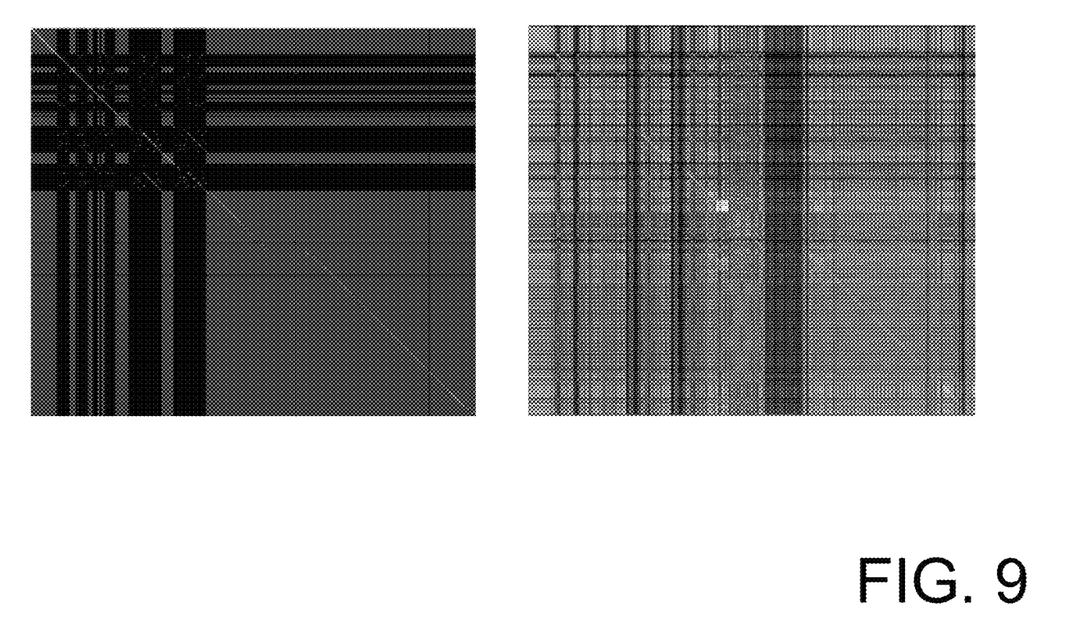
FIG. 9 is a schematic representation of two similarity matrices between nodes of two model graphs with a left image without "neighbor matching" and a right image with "neighbor matching."

The comparison of the model graph 24 of the current FPGA design 10 with the model graph 24 of the FPGA implementation 14 from the database 22 further includes neighbor matching for taking the neighborhood relationships into account. Such a method is known, for example, as "Measuring Similarity of Graph Nodes by Neighbor Matching" according to Nikolic. In this regard, two similarity matrices between the nodes 34 of two model graphs 24 are shown in FIG. 9. In the left-hand illustration of FIG. 9, the similarity matrix is shown without "neighbor matching" and in the right-hand illustration, it is shown with "neighbor matching".

The similarity between a node 34 of the model graph 24 of the current FPGA design 10 and a node 34 of the model graph 24 of the FPGA implementation 14 from the database 22 is thereby determined based on a match of differentiation points. The differentiation points include, for example, a block/net list path, a block/net list type, for example, add/multiply, block/net list parameters, e.g., bit width, binary point position. In the present case, a weighting of the differentiation points takes place.

Based on the measure thus determined for the similarity of the two model graphs 24, the similarity between the model graph 24 of the current FPGA design 10 and the model graph 24 of the FPGA implementation 14 from the database 22 is now checked to see whether it is higher than a similarity between the model graph 24 of the current FPGA design 10 and a best model graph 24 from the database 22. If the model graph 24 from the database 22 is the first model graph 24 for which the similarity to the model graph 24 of the current FPGA design 10 has been determined, then the model graph 24 from the database 22 is used as the best model graph 24 or reference 26. Alternatively, the reference 26 is only modified if the model graph 24 from the database 22 has a higher similarity than the previous reference 26. This is done, if applicable, in step S160. The method returns to step S150 if further model graphs 24 are included in the database 22 for comparison. The synthesis from step S100 is also checked to see if it has already ended. The comparison is only continued in step S150 if the synthesis of step S100 has not yet been completed.

Thus, if the synthesis from step S100 is completed or there are no further model graphs 24 in the database 22 for comparison, the measure of similarity of the current reference 26 is compared to a threshold value. If the measure of similarity is higher than the threshold value, then in step S170, the corresponding model graph 24 is provided as a reference 26 for generating the FPGA implementation 14 in step S110. Otherwise, this part of the method is aborted in step S180 without result. The threshold value here may be, for example, a similarity of 90%.

Figure 2:
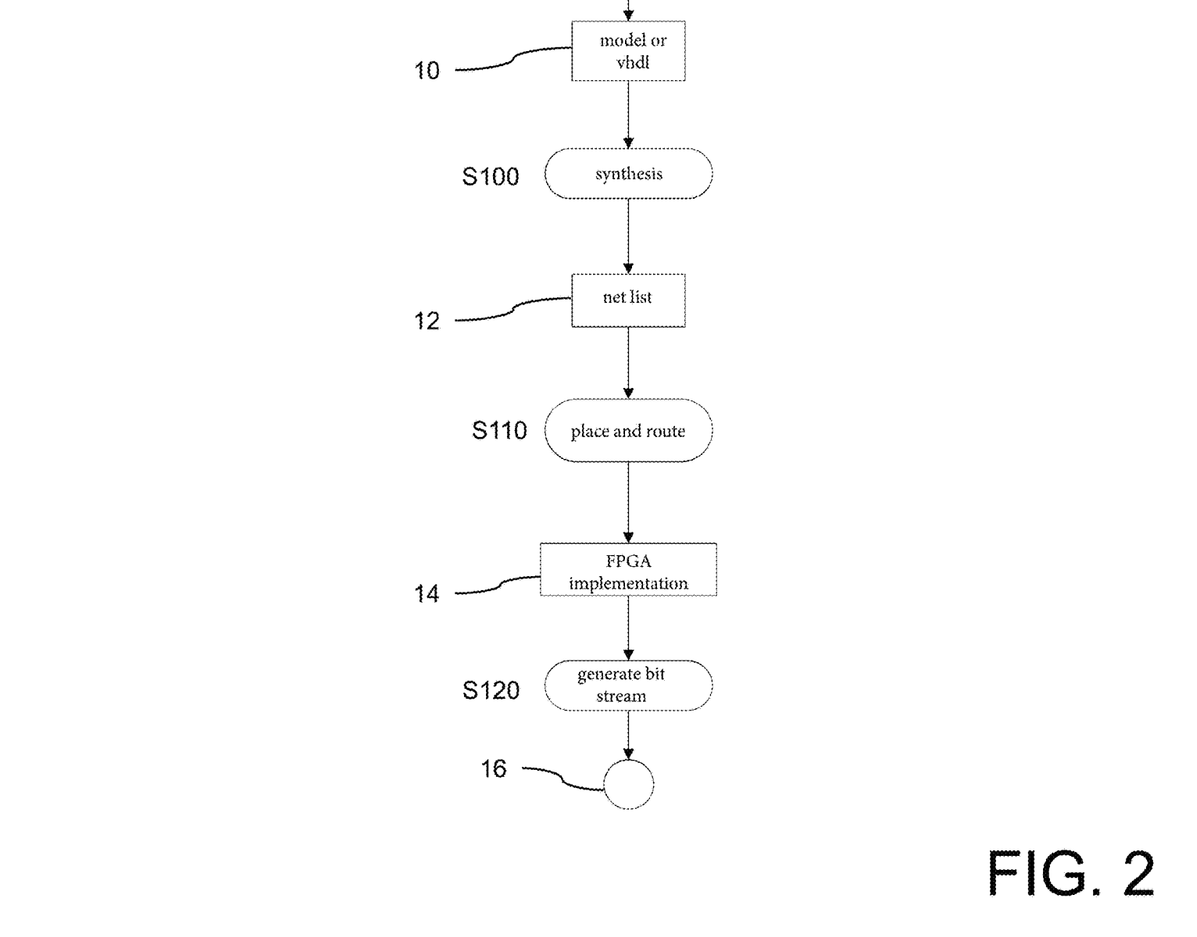
FIG. 2 is a detailed view of the flow diagram of FIG. 1 for generating the FPGA implementation and a bit stream.

The generation of the FPGA implementation 14 in step S110 is performed as follows. First, it is checked whether a similar FPGA implementation 14 based on the model graph 24 has been detected and provided by step S170. If this is not the case, a normal, conventional placing and routing is carried out in step S200 in order to create the FPGA implementation 14. Otherwise, the method proceeds to step S210.

In step S210, the FPGA implementation 14 is loaded from the database 22 for the reference. In step S220, an incremental placing and routing is then performed based on the FPGA implementation 14 from the database 22.

Figure 3:
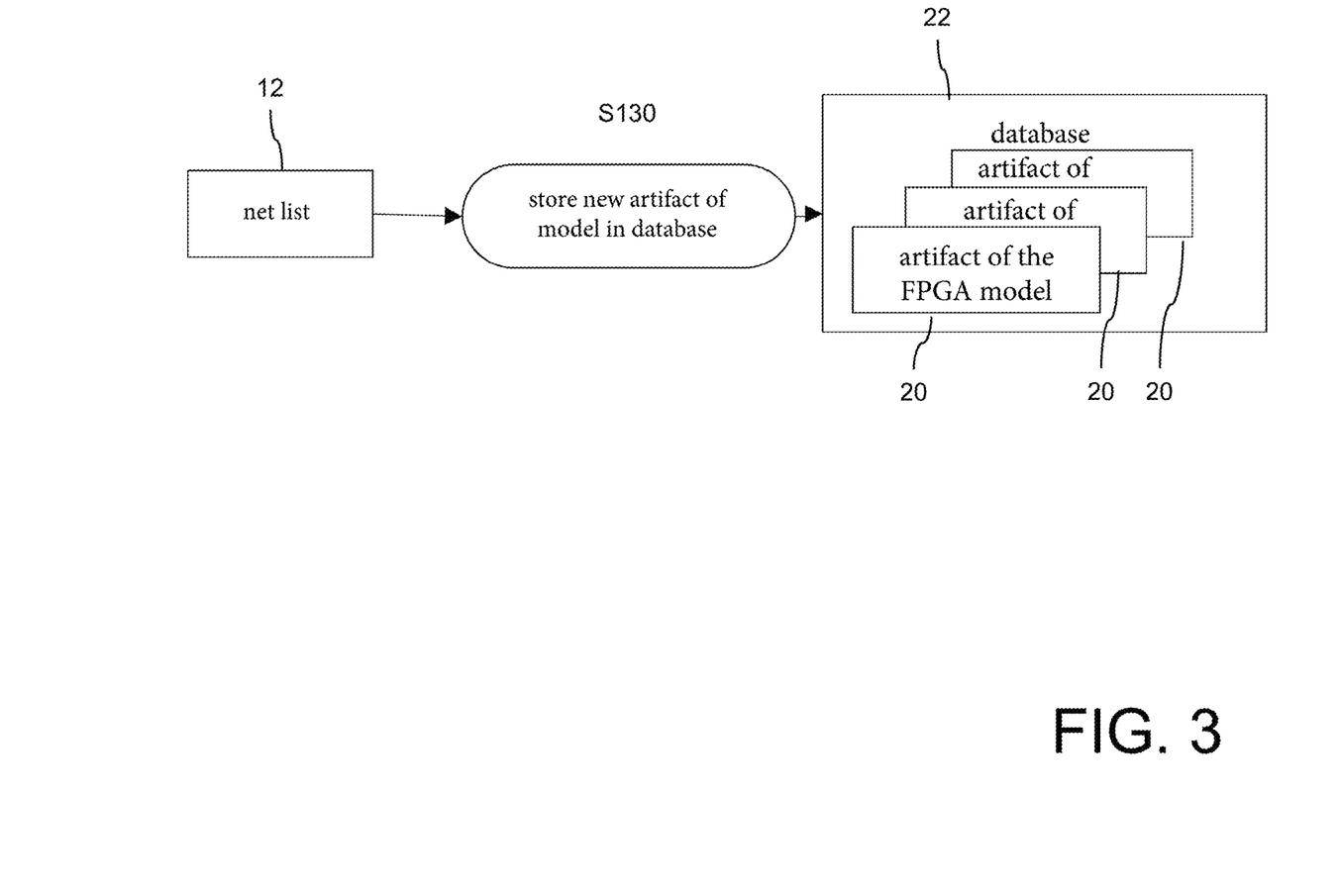
FIG. 3 is a detailed view of the flow diagram of FIG. 1 for filling the database with artifacts.

The database 22 is populated as shown in FIG. 3. In step S130, in each case the net list 12 of the current FPGA design 10, the associated model graph 24, and the generated FPGA implementation 14 are stored in the database 22 as artifacts 20 of the FPGA model 10. Each FPGA design 10 thus automatically forms an artifact 20 in the database 22 for a later comparison for a subsequent, more recent FPGA design 10.

Figure 5:
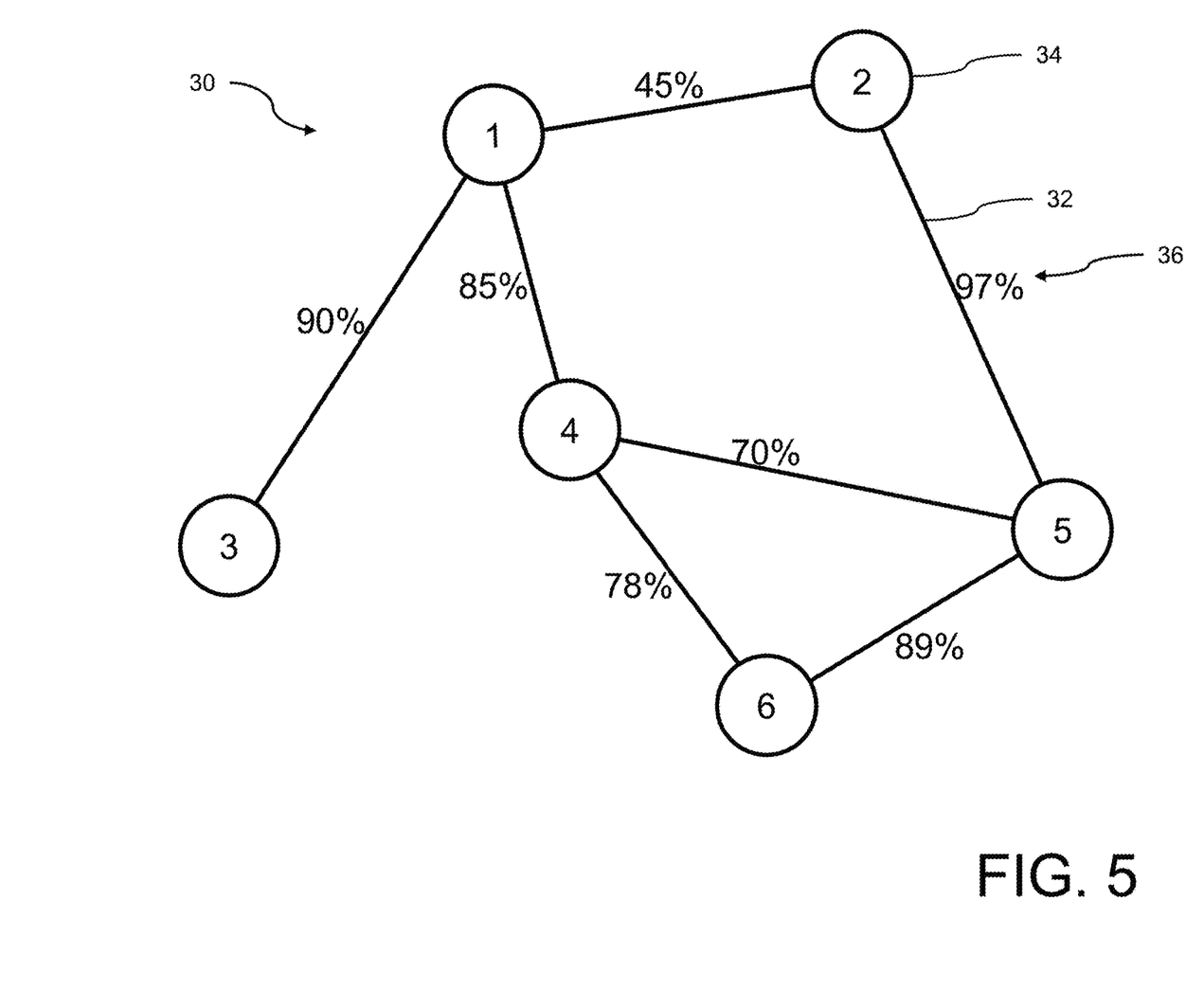
FIG. 5 is a schematic representation of a similarity graph with a plurality of edges between its nodes 34, as a first example.
Figure 6:
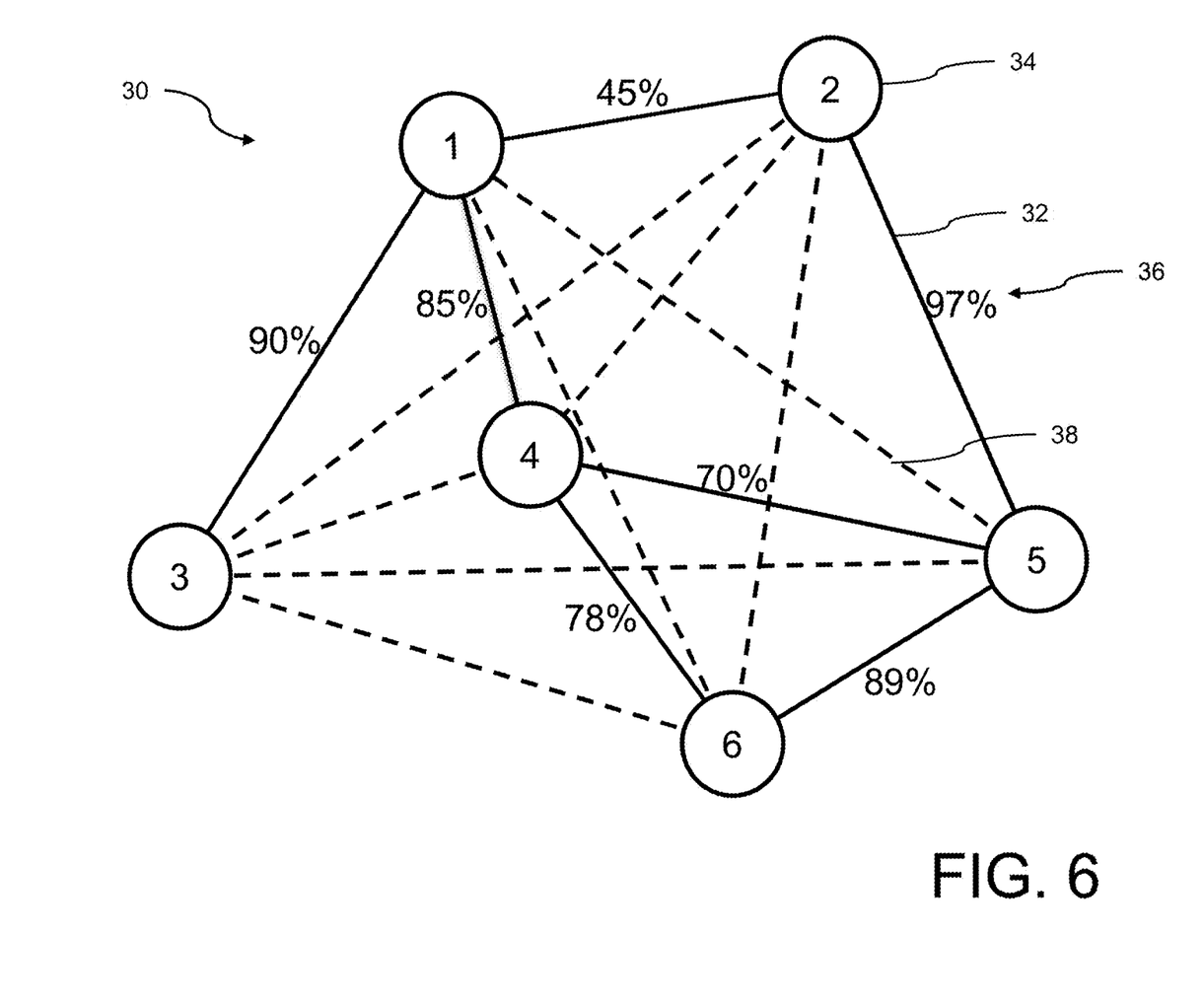
FIG. 6 is a schematic representation of a similarity graph in which an edge is formed between all nodes, as a second example.
Figure 7:
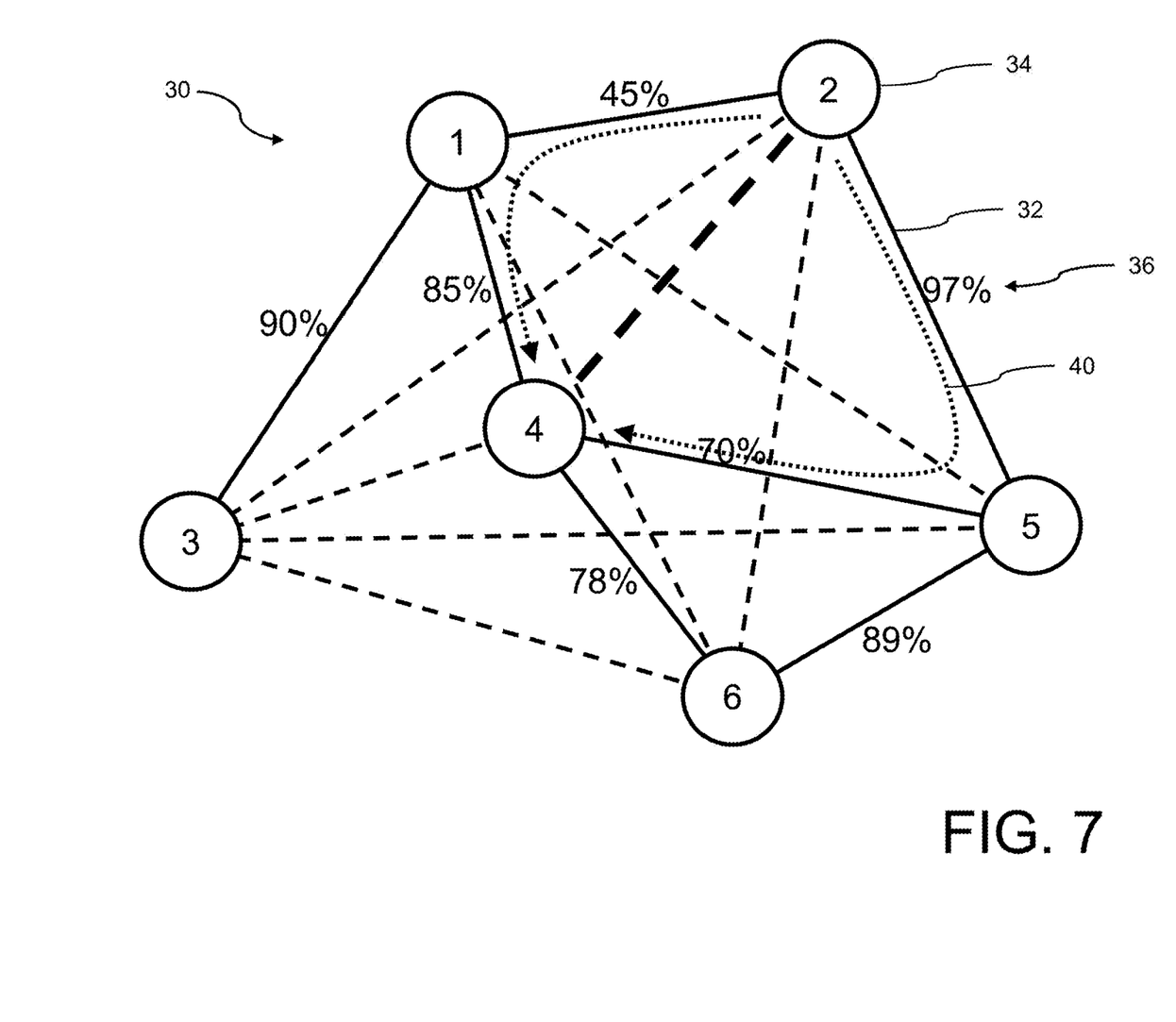
FIG. 7 is a schematic representation of a similarity graph in which an edge is formed between all nodes, wherein similarities between nodes determined non-explicitly are identified based on specific similarities between nodes, as a third example.

In addition, similarities of relationships between the model graphs 24 included in the database 22 are computed in a background step. The step of calculating the similarities of relationships between the model graphs 24 of the artifacts 20 contained in the database 22 is done in phases in which free resources can be used. A similarity graph 30 is created from several FPGA models 10. Various similarity graphs 30 are shown in FIGS. 5 to 7. In this case, analyzed similarities between two FPGA models 10 are specified as an edge 32 between the corresponding two nodes 34, which represent the FPGA models 10, and are indicated with a weight 36 as a measure of similarity. The similarity graph 30 is also referred to as a similarity diagram.

The similarity graph 30 in FIG. 5 only shows edges 32 between a few nodes 34, while the similarity graphs 30 in FIGS. 6 and 7 are complete similarity graphs 30. Based on already determined similarities between the nodes 34, which are shown as edges 32 with a solid line, the weights 36 of additional edges 38, which are shown as a dashed line, are determined. Completion can be achieved in several ways. For this purpose, the weight 36 of the additional edges 38 is successively supplemented by further similarity analyses according to a brute-force method for a full intermeshing of the similarity graph 30.

FIG. 7 shows a variant for the completion of the local similarity graph 30 based on an efficient computation sequence of existing edges 32 of FPGA designs 10. In this case, a similarity between two nodes 34 is estimated on the basis of the existing edges 32, where a potentially high similarity may be present, in order to perform a similarity analysis for them as a matter of priority. Thus, the additional edges 38 can be estimated by multiplying the weights 36 of the existing edges 32. This is exemplified in FIG. 7 for an additional edge 38 between the nodes 34 labeled '2' and '4' by multiplying the similarities along the dotted arrows 40 in order to estimate the similarity of the two nodes 34. Using this, weights 36 for the edges 32 having a high determined similarity can be primarily determined.

Based on the similarity graph 30, the comparison in step S150 can be simplified and accelerated.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for generating an FPGA implementation based on an FPGA design as an FPGA model and/or a hardware description, the method comprising:
    synthesizing a net list from the FPGA design;
    generating a graph-based representation based on the FGPA design;
    searching for a similar FGPA implementation; and
    generating the FPGA implementation from the net list using the similar FPGA implementation,
    wherein said searching for a similar FPGA implementation comprises comparing the graph-based representation of the FPGA design with a graph-based representation of the similar FPGA implementation.

2. The method according to claim 1, wherein the FPGA design comprises a partial implementation,
    wherein said searching for the similar FPGA implementation includes searching for a similar partial implementation, and
    wherein said generating the FPGA implementation is performed using the similar partial implementation.

3. The method according to claim 1, wherein said searching for the similar FPGA implementation comprises searching for a similar FPGA implementation in a database of prior FPGA implementations.

4. The method according to claim 1, further comprising identifying a modified sub-region of the FPGA design,
wherein said synthesizing the net list comprises the synthesis of the net list for the modified sub-region of the FPGA design, and
wherein said generating the FPGA implementation comprises generating the FPGA implementation for the net list of the modified sub-region of the FPGA design.

5. The method according to claim 1, further comprising:
determining a measure of similarity between the graph-based representation of the FPGA design and the graph-based representation of the at least one similar FPGA implementation; and
generating the FPGA implementation from the net list without using a similar FPGA implementation if a measure of similarity is below a threshold value.

6. The method according to claim 1, wherein said comparing the graph-based representation of the FPGA design with the graph-based representation of the similar FPGA implementation comprises solving a linear optimization problem in which for each node in a graph, and
wherein the most similar node is identified in another graph without duplicate assignment of a node.

7. The method according to claim 1, further comprising determining the similarity between a node of the graph-based representation of the FPGA design and a node of the graph-based representation of the at least one similar FPGA implementation, including determining a match of differentiation points.

8. The method according to claim 7, wherein said determining a match of the differentiation points comprises a weighting of the differentiation points.

9. The method according to claim 1, further comprising:
performing a similarity analysis of a plurality of graphs contained in the database; and
storing the computed similarities in a similarity diagram or matrix.

10. The method according to claim 9, further comprising calculating similarities of relationships between the graphs contained in the database.

11. The method according to claim 1, further comprising performing a prior determination of expected high similarities of relationships not yet determined using already determined similarities.

12. The method according to claim 1, wherein said comparing the graph-based representation of the FPGA design with a graph-based representation of the similar FPGA implementation comprises neighbor matching to account for neighborhood relationships.

13. The method according to claim 1, wherein said generating a graph-based representation based on the FPGA design comprises a de-hierarchization of the FPGA design while accounting for virtual connections and the application of a transformation function based on the de-hierarchization of the FPGA design.

14. The method of claim 1, wherein said synthesizing the net list from the FPGA design and said generating the graph-based representation based on the FPGA design are performed in parallel.

15. The method of claim 1, wherein said comparing the graph-based representation of the FPGA design with a graph-based representation of the at least one similar FPGA implementation is performed based on an algorithm for the similarity analysis of graphs.

16. A method of generating a bit stream based on an FPGA design serving as an FPGA model and/or a hardware description, the method comprising:
generating an FPGA implementation based on an FPGA design serving as an FPGA model and/or a hardware description according to claim 1; and
generating the bit stream from the generated FPGA implementation.

* * * * *